(12) United States Patent
Fukuta (10) Patent No.: US 11,691,592 B2
(45) Date of Patent: Jul. 4, 2023

(54) VEHICLE OCCUPANT RESTRAINT SYSTEM (71) Applicant: Toyota Jidosha Kabushiki Kaisha, Toyota (JP)

(72) Inventor: Kenji Fukuta, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

(21) Appl. No.: 16/945,186

(22) Filed: Jul. 31, 2020

(65) Prior Publication Data
US 2021/0107429 A1 Apr. 15, 2021

(30) Foreign Application Priority Data
Oct. 9, 2019 (JP) .................. 2019-186412

(51) Int. Cl.
B60R 22/46 (2006.01)
B60R 22/48 (2006.01)
(Continued)

(52) U.S. Cl.
CPC .............. B60R 22/46 (2013.01); B60R 22/48 (2013.01); B60R 2021/01272 (2013.01);
(Continued)

(58) Field of Classification Search
CPC .................. B60R 22/46; B60R 22/48; B60R 2021/01272; B60R 2022/4685; B60R 21/0134; B60W 50/14
See application file for complete search history.

(56) References Cited

U.S. PATENT DOCUMENTS

2001/0045483 A1    11/2001  Tanaka et al.
2008/0210802 A1*    9/2008  Sumiyashiki ......... B60R 22/405
                                                              242/379.1
(Continued)

FOREIGN PATENT DOCUMENTS

CN    103121434 A     5/2013
EP       1223089 A2 *  7/2002  ............ B60R 22/44
(Continued)

OTHER PUBLICATIONS

Kopetzky, Seat Belt Device, Jul. 17, 2017, EPO, EP 1223089 A2, Machine Translation of Description (Year: 2017).*

Primary Examiner — Paul N Dickson
Assistant Examiner — Matthew D Lee
(74) Attorney, Agent, or Firm — Dinsmore & Shohl LLP (57) ABSTRACT A CPU of an ECU is configured to compute an estimated acceleration that is estimated to be applied to a vehicle and a remaining time that is taken from present time to acceleration occurrence time at which the estimated acceleration occurs from a road surface condition detected by a road surface condition detection unit and a vehicle status detected by a vehicle speed determination unit and a steering angle velocity determination unit. The CPU is configured to, when the remaining time becomes shorter than or equal to a predetermined value, drive a retractor motor. The webbing is retracted before an occupant moves with an acceleration that is applied to the vehicle, so the occupant is held in a normal seated position. The retractor motor is driven when the time that is taken from present time to acceleration occurrence time becomes shorter than or equal to the predetermined value.

11 Claims, 10 Drawing Sheets (51) Int. Cl.
*B60R 22/28* (2006.01)
*B60R 21/01* (2006.01)

(52) U.S. Cl.
CPC . *B60R 2022/288* (2013.01); *B60R 2022/4666* (2013.01); *B60R 2022/4685* (2013.01); *B60R 2022/4808* (2013.01)

(56) References Cited

U.S. PATENT DOCUMENTS

| | | | | |
|---|---|---|---|---|
| 2011/0270493 | A1* | 11/2011 | Tanaka | B60R 22/48 701/45 |
| 2016/0082922 | A1* | 3/2016 | Yoon | B60R 22/40 297/478 |
| 2018/0222425 | A1* | 8/2018 | Hasegawa | B60N 2/42727 |
| 2021/0001801 | A1* | 1/2021 | Birk | B60R 22/46 |

FOREIGN PATENT DOCUMENTS

| | | | | |
|---|---|---|---|---|
| JP | 2001-347922 A | | 12/2001 | |
| JP | 2005-138756 A | | 6/2005 | |
| JP | 2007-050852 A | | 3/2007 | |
| JP | 2007050797 A | * | 3/2007 | |
| JP | 2007-091031 A | | 4/2007 | |
| JP | 2007-245877 A | | 9/2007 | |
| JP | 2018-138411 A | | 9/2018 | |
| WO | WO-2009074784 A2 | * | 6/2009 | ......... B60R 22/4628 |
| WO | WO-2009101512 A1 | * | 8/2009 | ......... B60R 21/0132 |
| WO | 2019185407 A1 | | 10/2019 | |

* cited by examiner

VEHICLE OCCUPANT RESTRAINT SYSTEM

CROSS-REFERENCE TO RELATED APPLICATIONS

This application claims priority to Japanese Patent Application No. 2019-186412 filed on Oct. 9, 2019, which is incorporated herein by reference in its entirety including the specification, drawings and abstract.

BACKGROUND

1. Technical Field

The disclosure relates to a vehicle occupant restraint system.

2. Description of Related Art

Japanese Unexamined Patent Application Publication No. 2018-138411 (JP 2018-138411 A) describes a seatbelt system that is able to retract a webbing by driving a motor. The seatbelt system is configured to drive the motor when an acceleration that is applied to a vehicle and detected by an acceleration sensor, or the like, satisfies a predetermined threshold.

SUMMARY

However, in the seatbelt system described in JP 2018-138411 A, the motor is driven after an acceleration is applied to the vehicle, so the webbing is retracted after an occupant starts moving with the acceleration. Therefore, the occupant may be not held in a normal seated position. To deal with this, it is conceivable to detect a road surface condition in advance and drive the motor at the time when an acceleration is anticipated to be applied to the vehicle. However, increasing the tension of the webbing from before an acceleration is applied to the vehicle is not desirable from the viewpoint of ensuring comfort, so there is still room for improvement over the above-described related art in these points.

The disclosure provides a vehicle occupant restraint system that is able to achieve both comfort and occupant protection performance.

An aspect of the disclosure provides a vehicle occupant restraint system. The vehicle occupant restraint system includes a seatbelt device configured to be able to restrain an occupant seated on a vehicle seat by using a webbing of which one end is wound on a take-up device and the other end is fixed to the vehicle seat or a vehicle body and configured to be able to take up the webbing by driving a motor provided in the take-up device, a road surface condition detection unit configured to detect a road surface condition ahead of a vehicle in a direction of travel, a vehicle status detection unit configured to detect a status of the vehicle, and a controller configured to compute an estimated acceleration that is estimated to be applied to the vehicle and a time that is taken from present time to acceleration occurrence time at which the estimated acceleration is anticipated to occur from the road surface condition detected by the road surface condition detection unit and the status of the vehicle, detected by the vehicle status detection unit, and, when the estimated acceleration is higher than or equal to a predetermined acceleration threshold and the time that is taken from present time to acceleration occurrence time at which the estimated acceleration is anticipated to occur becomes shorter than or equal to a predetermined value, take up the webbing by a predetermined amount by driving the motor.

With the vehicle occupant restraint system according to the aspect, one end of the webbing of the seatbelt device is wound on the take-up device, and the other end is fixed to the vehicle seat or the vehicle body. The vehicle occupant restraint system is configured to be able to restrain the occupant to the vehicle seat with the webbing. The take-up device includes the motor. The webbing is taken up by the motor being driven. Thus, even when a relatively high acceleration is input to the vehicle, an inertial movement of the occupant is reduced by increasing the tension of the webbing.

The vehicle occupant restraint system includes the road surface condition detection unit configured to detect a road surface condition ahead of the vehicle in the direction of travel, the vehicle status detection unit configured to detect the status of the vehicle, and the controller configured to drive the motor. The controller is configured to, when the estimated acceleration that is estimated to be applied to the vehicle and the time that is taken from present time to occurrence of the estimated acceleration from the road surface condition detected by the road surface condition detection unit and the status of the vehicle, detected by the vehicle status detection unit. The controller is configured to, when the estimated acceleration is higher than or equal to the predetermined acceleration threshold and the time that is taken until the estimated acceleration occurs becomes shorter than or equal to the predetermined value, drive the motor. In other words, the webbing is retracted before the occupant moves with the acceleration that is applied to the vehicle, so the occupant is held in a normal seated position. By driving the retractor motor when the time that is taken from present time to occurrence of the estimated acceleration becomes shorter than or equal to the predetermined value, a time during which the tension of the webbing is increased is shortened.

In the vehicle occupant restraint system according to the aspect, the seatbelt device may include a holding mechanism configured to restrict pulling out of the webbing after the webbing is taken up by the predetermined amount by the controller.

With the vehicle occupant restraint system according to the aspect, the seatbelt device includes the holding mechanism, and the holding mechanism restricts pulling out of the webbing after the webbing is taken up by the predetermined amount by the controller. Therefore, the output of the motor does not need to be increased to hold a state after the webbing is taken up.

In the vehicle occupant restraint system according to the aspect, the controller may be configured to, when a predetermined time has elapsed in a state where the estimated acceleration is lower than or equal to the predetermined acceleration threshold after the webbing is taken up, cancel taking up of the webbing.

With the vehicle occupant restraint system according to the aspect, the controller is configured to, when the predetermined time has elapsed in a state where the estimated acceleration is lower than or equal to the predetermined acceleration threshold after the webbing is taken up, cancel taking up of the webbing. Therefore, in a situation in which an estimated acceleration over the acceleration threshold occurs multiple times at short intervals, the repeated operations of taking up of the webbing and cancelling taking up are reduced.

In the vehicle occupant restraint system according to the aspect, the controller may be configured to be able to control the motor in a normal control stage in which the motor is driven at a normal driving force and a preliminary control stage in which the motor is driven at a driving force less than the normal driving force, and the controller may be configured to, when the time that is taken from present time to acceleration occurrence time at which the estimated acceleration is anticipated to occur becomes shorter than or equal to the predetermined value, drive the motor in the preliminary control stage and then drive the motor in the normal control stage.

With the vehicle occupant restraint system according to the aspect, the controller is configured to, when the time that is taken from present time to occurrence of the estimated acceleration becomes shorter than or equal to the predetermined value, take up the webbing with a small force and then take up the webbing with a large force. Therefore, a slack of the webbing is eliminated by taking up the webbing with a small force in an initial stage, and then the occupant is restrained by taking up the webbing with a large force. Hence, impact that the occupant receives from the webbing at the time when the webbing is taken up is reduced.

In the vehicle occupant restraint system according to the aspect, the seatbelt device may include an emergency lock mechanism configured to, when a take-up shaft of the take-up device rotates at a predetermined rotation speed or higher, stop rotation of the take-up shaft, and the controller may be configured to drive the motor such that the take-up shaft reaches the predetermined rotation speed in the normal control stage.

With the vehicle occupant restraint system according to the aspect, the seatbelt device includes the emergency lock mechanism configured to stop rotation of the take-up shaft when the take-up shaft rotates at the predetermined speed or higher. The emergency lock mechanism is generally adopted to a seatbelt device as a mechanism configured to safely restrain an occupant that moves with an impact load by locking pulling out of a webbing in the event of a collision of a vehicle. The controller is configured to drive the motor such that the take-up shaft reaches the predetermined rotation speed in the normal control stage, so pulling out of the webbing is locked and the state after the webbing is taken up is held by the emergency lock mechanism without providing a new lock mechanism.

In the vehicle occupant restraint system according to the aspect, the controller may be connected to a switch operational by the occupant of the vehicle and may be configured to take up the webbing by the predetermined amount or cancel taking up of the webbing when the switch is operated.

With the vehicle occupant restraint system according to the aspect, taking up of the webbing by the predetermined amount or canceling taking up by operating the switch connected to the controller, so the occupant is restrained or restraining is canceled at occupant's required timing.

In the vehicle occupant restraint system according to the aspect, the switch may be a drive mode select switch.

With the vehicle occupant restraint system according to the aspect, since the switch is the drive mode select switch, the webbing is taken up at the time when drive modes in which an acceleration is easily applied to the vehicle, such as rough road driving and sport driving, are selected. In addition, taking up of the webbing by the motor is canceled at the time when the drive mode select switch is changed from a drive mode in which an acceleration is easily applied to the vehicle to another drive mode. Therefore, taking up of the webbing and canceling taking up of the webbing at unexpected timing are reduced in a drive state where an acceleration is easily applied to the vehicle, and the occupant is restrained in an early stage.

As described above, with the vehicle occupant restraint system according to the above aspect, both comfort and occupant protection performance are achieved.

With the vehicle occupant restraint system according to the above aspect, cost is reduced.

With the vehicle occupant restraint system according to the aspect, comfort is improved.

With the vehicle occupant restraint system according to the aspect, the occupant is restrained at appropriate timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A vehicle occupant restraint system 10 according to a first embodiment will be described with reference to FIG. 1 to FIG. 5. The arrow FR, the arrow UP, and the arrow RH shown in the drawings as needed respectively indicate the front side, upper side, and right-hand side of a vehicle. Hereinafter, when description will be made by simply using front and rear, up and down, and right and left directions, these directions respectively mean front and rear in a vehicle front-rear direction, up and down in a vehicle up-down direction, and right and left when oriented in the vehicle forward direction unless otherwise specified.

Figure 1:
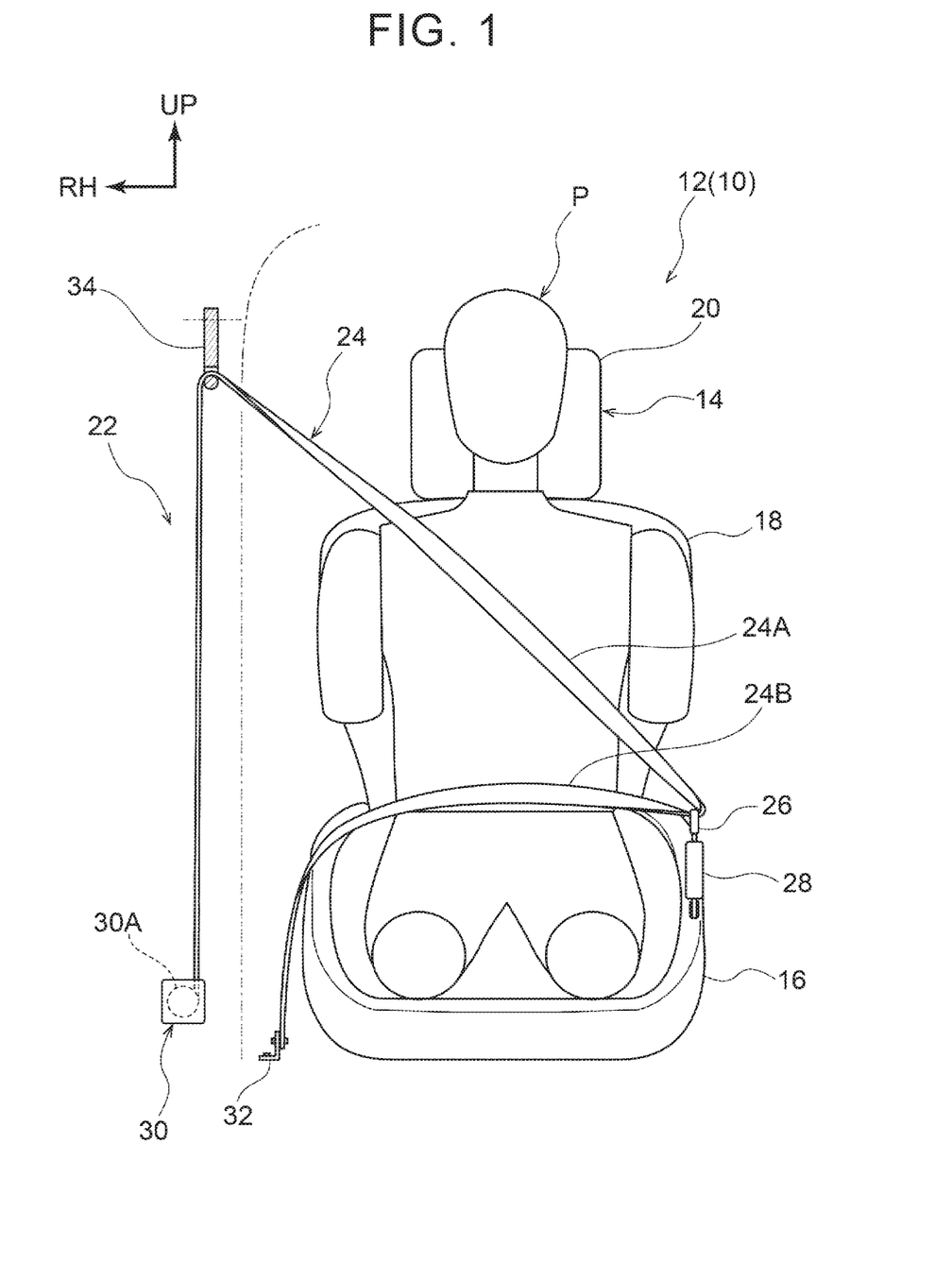
FIG. 1 is a schematic front view of a vehicle seat to which a vehicle occupant restraint system according to a first embodiment is applied when viewed from a vehicle front.
Figure 3:
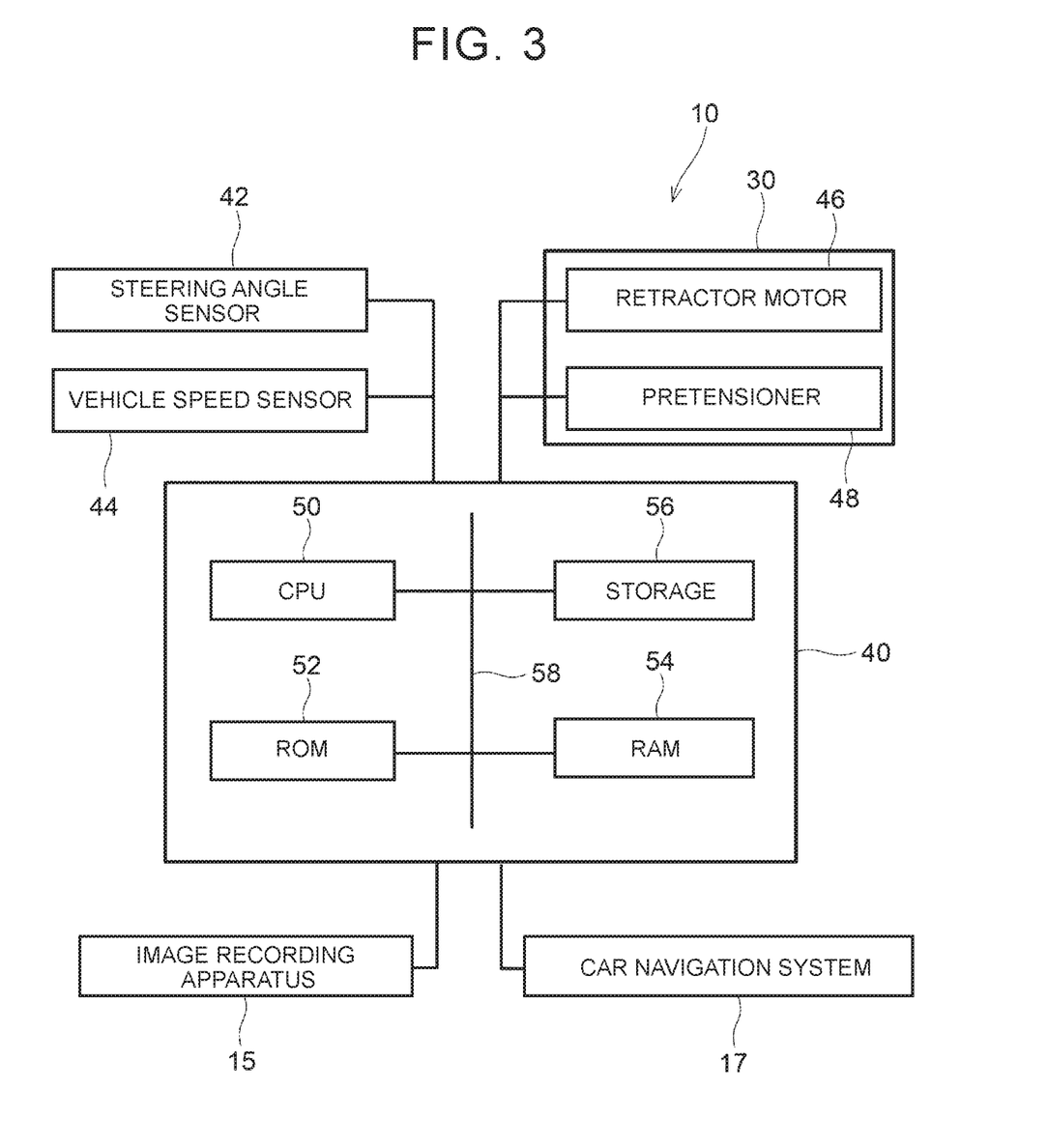
FIG. 3 is a block diagram that shows the hardware configuration of the vehicle occupant restraint system according to the first embodiment.

As shown in FIG. 1, a vehicle 12 to which the vehicle occupant restraint system 10 according to the present embodiment is applied includes vehicle seats 14, an image recording apparatus 15, and a car navigation system 17 (see FIG. 3). Each vehicle seat 14 is made up of a seat cushion 16 and a seat back 18. The seat cushion 16 is able to support the buttocks and thighs of an occupant P from a seat lower side. The seat back 18 is coupled to the rear end of the seat cushion 16 and is able to support the back of the occupant P. A head rest 20 is provided at the upper end of the seat back 18. The head rest 20 is able to support the head of the occupant P.

A seatbelt device 22 is provided in each vehicle seat 14. The seatbelt device 22 includes a webbing 24, a tongue 26, a buckle 28, and a retractor 30 serving as a take-up device.

The webbing 24 is formed in a long band. One end of the webbing 24 is wound on a spool 30A serving as a take-up shaft of the retractor 30 (described later). The webbing 24 is pulled out upward from the retractor 30, routed through a belt guide 34 provided on the vehicle 12, and obliquely extended from the right shoulder of the occupant P seated on the right-side vehicle seat 14 to the left hip of the occupant P (for an occupant P seated on the left-side vehicle seat 14, from the left shoulder to the right hip).

The webbing 24 is passed through the tongue 26. The tongue 26 is engaged with the buckle 28 of the vehicle seat 14 at the position of the hip of the occupant P. The webbing 24 is folded back at the tongue 26 and extended to the seat right side, and the other end of the webbing 24 is fixed to an anchor 32 provided on the floor of the vehicle 12. The occupant P seated on the vehicle seat 14 can be restrained by the webbing 24. A part of the webbing 24, obliquely extended on the front of upper body of the occupant P, is a shoulder belt part 24A, and a part of the webbing 24, extended right and left across the hips of the occupant P, is a lap belt part 24B.

The retractor 30 includes the rotatable spool 30A inside. One end of the webbing 24 is wound on the spool 30A. The spool 30A is connected to a retractor motor (not shown). The spool 30A is rotated in a take-up direction or pull-out direction when the retractor motor is driven. Furthermore, the retractor 30 includes a pretensioner (not shown). When the pretensioner is activated in the event of collision, or the like, of the vehicle, the spool 30A is forced to rotate in the take-up direction to increase the tension of the webbing 24.

Figure 2:
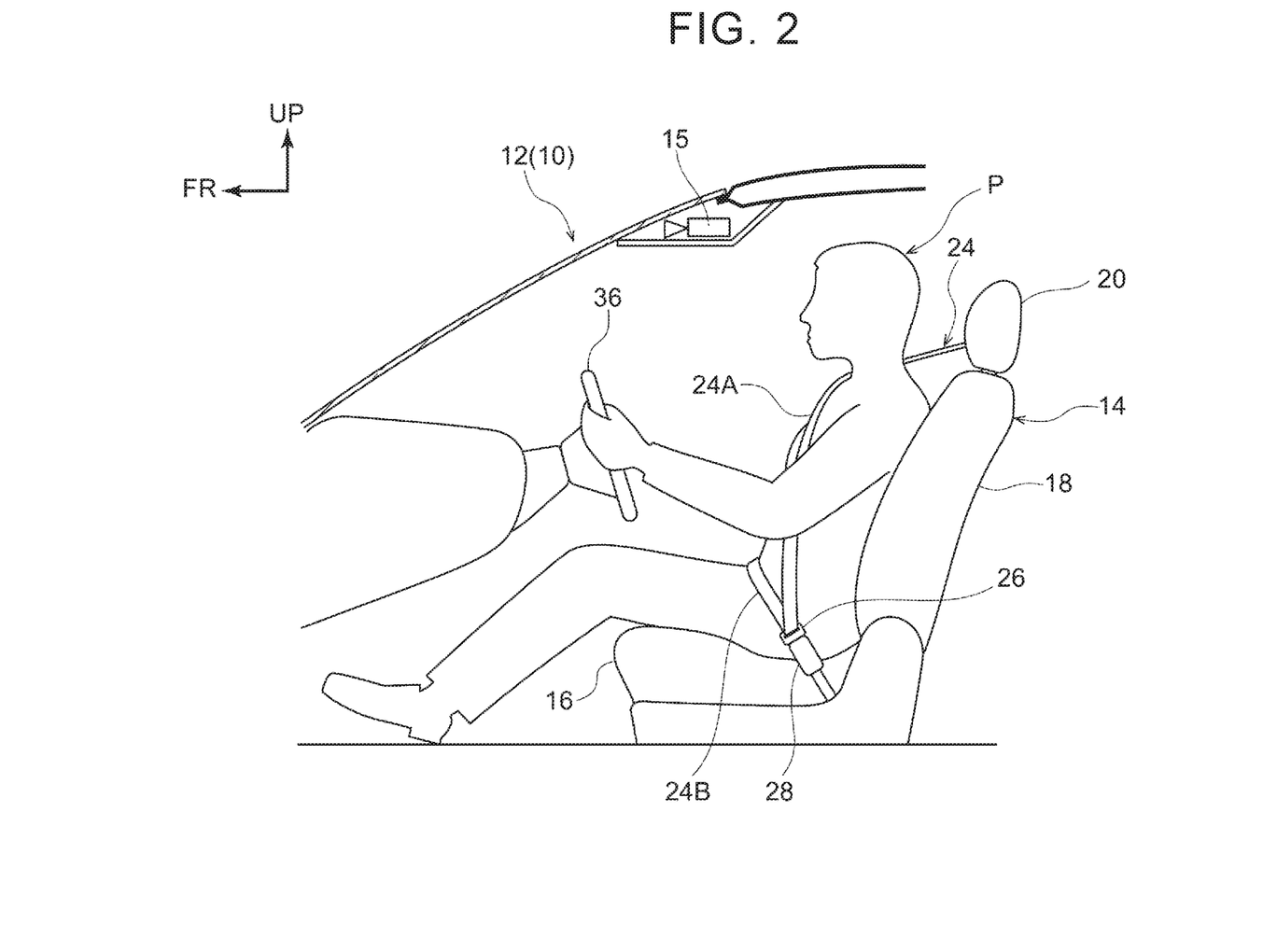
FIG. 2 is a schematic side view of a cabin of the vehicle to which the vehicle occupant restraint system according to the first embodiment is applied when viewed in a vehicle width direction.

As shown in FIG. 2, the vehicle seat 14 of the present embodiment is a seat provided as a driver seat of a right-hand drive vehicle, and a steering wheel 36 is provided in front of the vehicle seat 14. When the occupant P grips the steering wheel 36 and steers to the right or left, the vehicle 12 is turned to the right or left.

The image recording apparatus 15 is provided in a vehicle cabin of the vehicle 12. The image recording apparatus 15 records a scene outside the vehicle mainly a side toward the front of the vehicle 12, specifically, mainly a road surface ahead of the vehicle 12. This recorded video image is sent to an ECU 40 (described later).

FIG. 3 is a block diagram that shows the hardware configuration of the vehicle occupant restraint system 10. As shown in FIG. 3, the vehicle occupant restraint system 10 includes an electrical control unit (ECU) 40 serving as a controller. The ECU 40 is electrically connected to a steering angle sensor 42, a vehicle speed sensor 44, the retractor motor 46, the pretensioner 48, the image recording apparatus 15, and the car navigation system 17.

The steering angle sensor 42 is a sensor that detects the steering angle of the steering wheel 36. The vehicle speed sensor 44 is a sensor that detects the speed of the vehicle 12.

The steering angle detected by the steering angle sensor 42 and the vehicle speed detected by the vehicle speed sensor 44 are input to the ECU 40.

The retractor motor 46 rotates the spool 30A in the take-up direction or the pull-out direction when driven by a signal from the ECU 40. Thus, the webbing 24 is taken up by the retractor 30 or the webbing 24 is pulled out from the retractor 30. The pretensioner 48 forces the spool 30A to rotate in the take-up direction when activated by a signal from the ECU 40.

The car navigation system 17 highly accurately detects the current position of the vehicle 12 by comparing the current position of the vehicle 12, measured by receiving signals from satellites, with map information stored in a storage medium, such as a DVD and a hard disk drive. The car navigation system 17 has functions to display the current position of the vehicle 12 on a map displayed on a display device (not shown) and to acquire information around the current position of the vehicle 12 (for example, information on various facilities, or the like) in response to an instruction from the occupant P from the storage medium and display the information on the display device. Furthermore, the car navigation system 17 according to the present embodiment performs guidance to a preset destination based on the detected current position of the vehicle 12 and the map information, acquires the direction of the guidance and road surface information such as the condition of a road surface of a road on which the vehicle 12 is running, the width of the road, forward visibility, and the status (such as radius of curvature) of a curve, from the prestored map information, and outputs the information to the ECU 40 in response to a request from the ECU 40.

The ECU 40 includes a central processing unit (CPU) 50 serving as a processor, a read only memory (ROM) 52, a random access memory (RAM) 54, and a storage 56. These components are connected to one another via a bus 58 so as to be communicable.

The CPU 50 is a central processing unit. The CPU 50 runs various programs and controls various units. In other words, the CPU 50 reads out programs from the ROM 52 or the storage 56 and runs the programs by using the RAM 54 as a work area. The CPU 50 executes control over the above-described components and various arithmetic processing in accordance with the programs recorded on the ROM 52 or the storage 56.

The ROM 52 stores various programs and various data. The RAM 54 temporarily stores programs or data as a work area. The storage 56 is a hard disk drive (HDD) or a solid state drive (SSD). The storage 56 stores various programs including an operating system, and various data.

The vehicle occupant restraint system 10 realizes various functions by using the hardware resources shown in FIG. 3. Functional components that are realized by the vehicle occupant restraint system 10 will be described with reference to FIG. 4.

Figure 4:
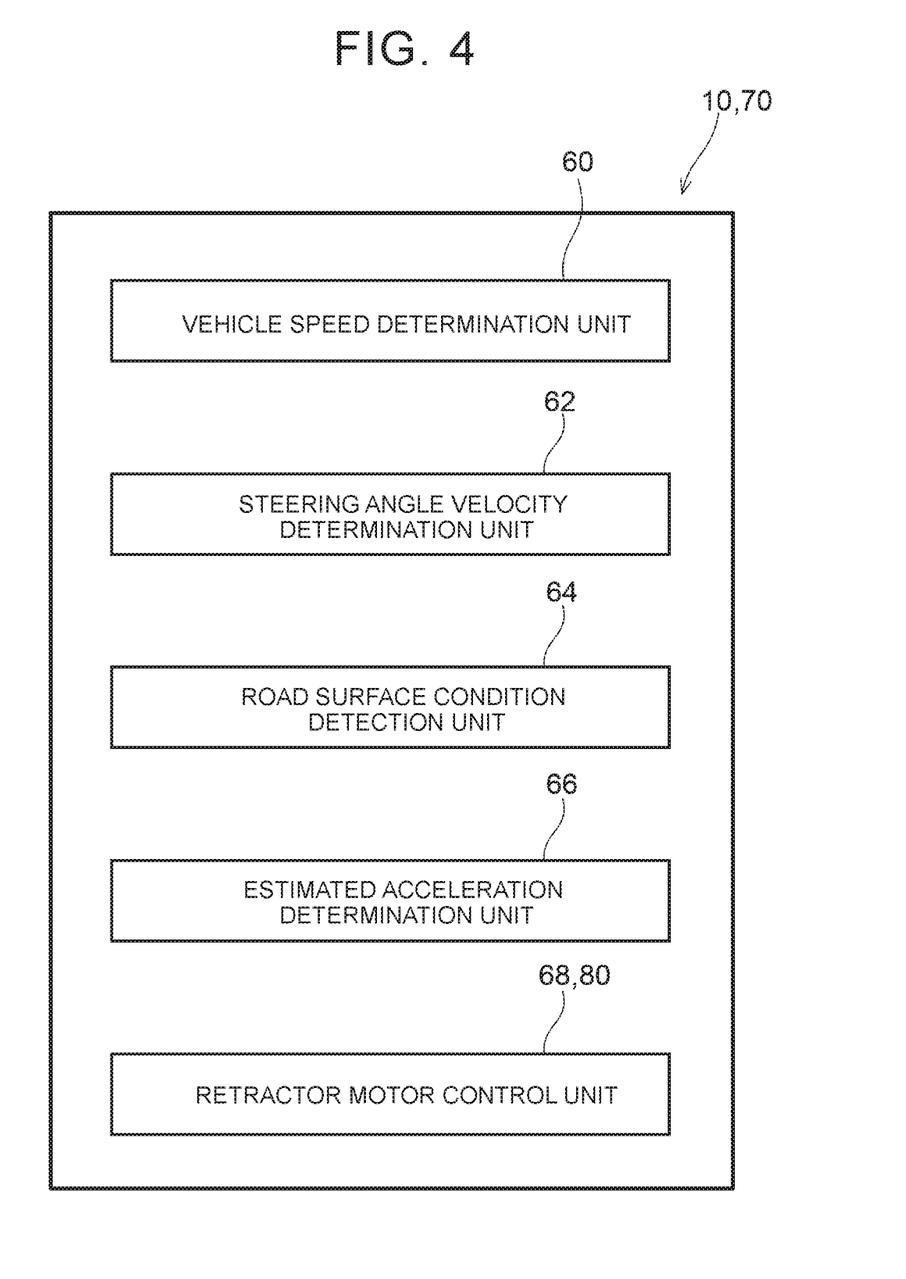
FIG. 4 is a block diagram that shows the functional configuration of the vehicle occupant restraint system according to the first embodiment.

As shown in FIG. 4, the vehicle occupant restraint system 10 includes a vehicle speed determination unit 60 and a steering angle velocity determination unit 62 serving as a vehicle status detection unit, a road surface condition detection unit 64, an estimated acceleration determination unit 66, and a retractor motor control unit 68 as functional components. The functional components are realized by the CPU 50 of the ECU 40 reading and running programs stored in the ROM 52 or the storage 56.

The vehicle speed determination unit 60 determines whether the vehicle speed of the vehicle 12, detected by the vehicle speed sensor 44, is higher than or equal to a predetermined vehicle speed threshold. The road surface condition detection unit 64 detects a road surface condition ahead of the vehicle 12 in the direction of travel. Specifically, the road surface condition detection unit 64 acquires road surface information ahead of the current location of the vehicle 12 from the car navigation system 17, performs image analysis on a video image recorded by the image recording apparatus 15, and detects a road surface condition ahead of the vehicle 12 in the direction of travel based on these pieces of information.

The steering angle velocity determination unit 62 determines a current steering angle velocity. In the present embodiment, a steering angle velocity is calculated based on the steering angle of the steering wheel 36, detected by the steering angle sensor 42. Specifically, a steering angle velocity is calculated by the differentiation of the steering angle.

The estimated acceleration determination unit 66 determines whether an estimated acceleration estimated to be applied to the vehicle 12 is higher than or equal to a predetermined acceleration threshold. In the present embodiment, an estimated acceleration is calculated based on the vehicle speed detected by the vehicle speed sensor 44, the steering angle detected by the steering angle sensor 42, and a road surface condition. For example, on a road surface having large undulations, a rough road, or a tight curve, an estimated acceleration is calculated to be higher as compared to a flat road surface. When a vehicle speed is high or when a variation in steering angle, which is estimated from a current steering angle, is large as well, an estimated acceleration is calculated to be higher as compared to when a vehicle speed is low or when a variation in steering angle is small.

The estimated acceleration determination unit 66 calculates a time (hereinafter, referred to as "remaining time") that is taken from present time to acceleration occurrence time at which an estimated acceleration occurs when the estimated acceleration is higher than or equal to the acceleration threshold.

The retractor motor control unit 68 controls the direction and amount in which the spool 30A is rotated by the retractor motor 46 of the seatbelt device 22.

Figure 5:
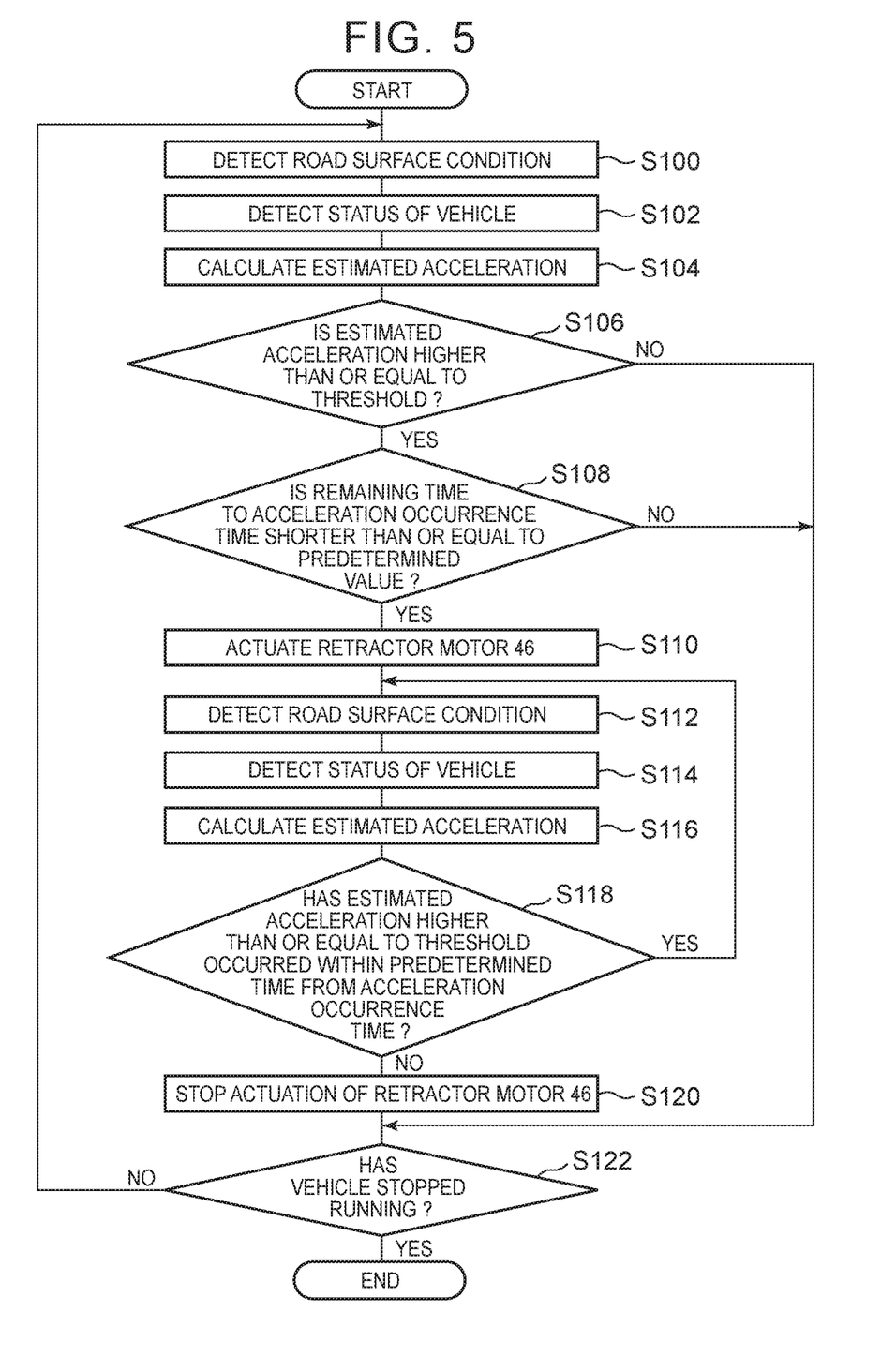
FIG. 5 is a flowchart that shows the flow of an occupant restraining process according to the first embodiment.

Next, the flow of an occupant restraining process that the vehicle occupant restraint system 10 executes will be described with reference to the flowchart of FIG. 5. For example, the occupant restraining process is executed by the CPU 50 reading out the program from the ROM 52 or the storage 56, expanding the program on the RAM 54, and running the program.

The CPU 50 detects a road surface condition ahead of the vehicle 12 in the direction of travel with the image recording apparatus 15 and the car navigation system 17 in step S100 and goes to step S102. The CPU 50 detects the status of the vehicle from the vehicle speed sensor 44 and the steering angle sensor 42 in step S102 and goes to step S104. The CPU 50 calculates an estimated acceleration that is applied to the vehicle 12 from the road surface condition and the status of the vehicle 12 in step S104 and goes to step S106.

The CPU 50 determines in step S106 whether the estimated acceleration that is applied to the vehicle 12 is higher than or equal to the acceleration threshold. The CPU 50 goes to step S108 when the estimated acceleration is higher than or equal to the acceleration threshold or goes to step S122 when the estimated acceleration is lower than the acceleration threshold.

The CPU 50 determines in step S108 whether the remaining time is shorter than or equal to a predetermined value. The CPU 50 goes to step S110 when the remaining time is shorter than or equal to the predetermined value or goes to step S122 when the remaining time is not shorter than or equal to the predetermined value.

The CPU 50 actuates the retractor motor 46 in step S110. The CPU 50 controls the retractor motor 46 with the function of the retractor motor control unit 68 such that the spool 30A is rotated in the take-up direction by a predetermined amount. The CPU 50 goes to step S112.

The CPU 50 detects a road surface condition ahead of the vehicle 12 in the direction of travel with the image recording apparatus 15 and the car navigation system 17 in step S112 and goes to step S114. The CPU 50 detects the status of the vehicle from the vehicle speed sensor 44 and the steering angle sensor 42 in step S114 and goes to step S116. The CPU 50 calculates an estimated acceleration that is applied to the vehicle 12 from the road surface condition and the status of the vehicle 12 in step S116 and goes to step S118.

The CPU 50 determines in step S118 whether the estimated acceleration (the estimated acceleration that is calculated in step S116) higher than or equal to the acceleration threshold occurs within a predetermined time based on acceleration occurrence time of the estimated acceleration calculated in step S104. The CPU 50 goes to step S120 when the estimated acceleration higher than or equal to the acceleration threshold does not occur within the predetermined time or returns to step S112 when the estimated acceleration higher than or equal to the acceleration threshold occurs within the predetermined time.

The CPU 50 stops the retractor motor 46 in step S120 and then goes to step S122.

The CPU 50 determines in step S122 whether the vehicle 12 stops running. The CPU 50 ends the process based on the program when the vehicle 12 stops running or goes to step S100 when the vehicle 12 has not stopped running.

As described above, in the occupant restraining process of the present embodiment, when an estimated acceleration is higher than or equal to the acceleration threshold and a remaining time to acceleration occurrence time is shorter than or equal to the predetermined time, the webbing 24 is taken up by a predetermined amount. Thus, the tension of the webbing 24 is increased, with the result that the inertial movement of the occupant P is reduced. When an estimated acceleration higher than or equal to the acceleration threshold occurs within the predetermined time after the tension of the webbing 24 is increased, a state where the tension of the webbing 24 is increased is maintained. Thus, a frequent change in the tension of the webbing 24 is reduced.

Operation and Effects of First Embodiment

Next, the operation and effects of the present embodiment will be described.

In the vehicle occupant restraint system 10 of the present embodiment, as shown in FIG. 1 and FIG. 3, the retractor 30 of the seatbelt device 22 includes the retractor motor 46. When the retractor motor 46 is driven, the spool 30A rotates in the take-up direction, and the webbing 24 is taken up. Thus, when a high acceleration is input to the vehicle 12, the inertial movement of the occupant P is reduced by increasing the tension of the webbing 24.

The vehicle occupant restraint system 10 includes the road surface condition detection unit 64 that detects a road surface condition ahead of the vehicle 12 in the direction of travel, the vehicle speed determination unit 60 and steering angle velocity determination unit 62 that detect the status of the vehicle 12, and the ECU 40 that drives the retractor motor 46. The CPU 50 of the ECU 40 computes an estimated acceleration that is estimated to be applied to the vehicle 12 and a remaining time from the road surface condition detected by the road surface condition detection unit 64 and the status of the vehicle 12, detected by the vehicle speed determination unit 60 and the steering angle velocity determination unit 62. The CPU 50 drives the retractor motor 46 when the estimated acceleration is higher than or equal to the predetermined acceleration threshold and the remaining time becomes shorter than or equal to the predetermined value. In other words, the webbing 24 is retracted before the occupant P moves with an acceleration that is applied to the vehicle 12, so the occupant P is held in a normal seated position. By driving the retractor motor 46 when the remaining time becomes shorter than or equal to the predetermined value, a time during which the tension of the webbing 24 is increased is shortened. Thus, both comfort and occupant protection performance are achieved.

Furthermore, the CPU 50 cancels taking up of the webbing 24 when a predetermined time has elapsed in a state where the estimated acceleration is lower than or equal to the predetermined acceleration threshold after the webbing 24 is taken up. Therefore, in a situation in which an estimated acceleration frequently occurs, the repeated operations of taking up of the webbing 24 and canceling taking up are reduced. Thus, comfort is improved.

Second Embodiment

Next, a vehicle occupant restraint system according to a second embodiment will be described with reference to FIG. 4, FIG. 6, and FIG. 7. Like reference signs denote similar components to those of the first embodiment, and the description will not be repeated as needed.

The vehicle occupant restraint system 70 of the present embodiment has a basically similar configuration to that of the first embodiment and differs from that of the first embodiment in that a holding mechanism is provided in a seatbelt device 72.

Figure 6:
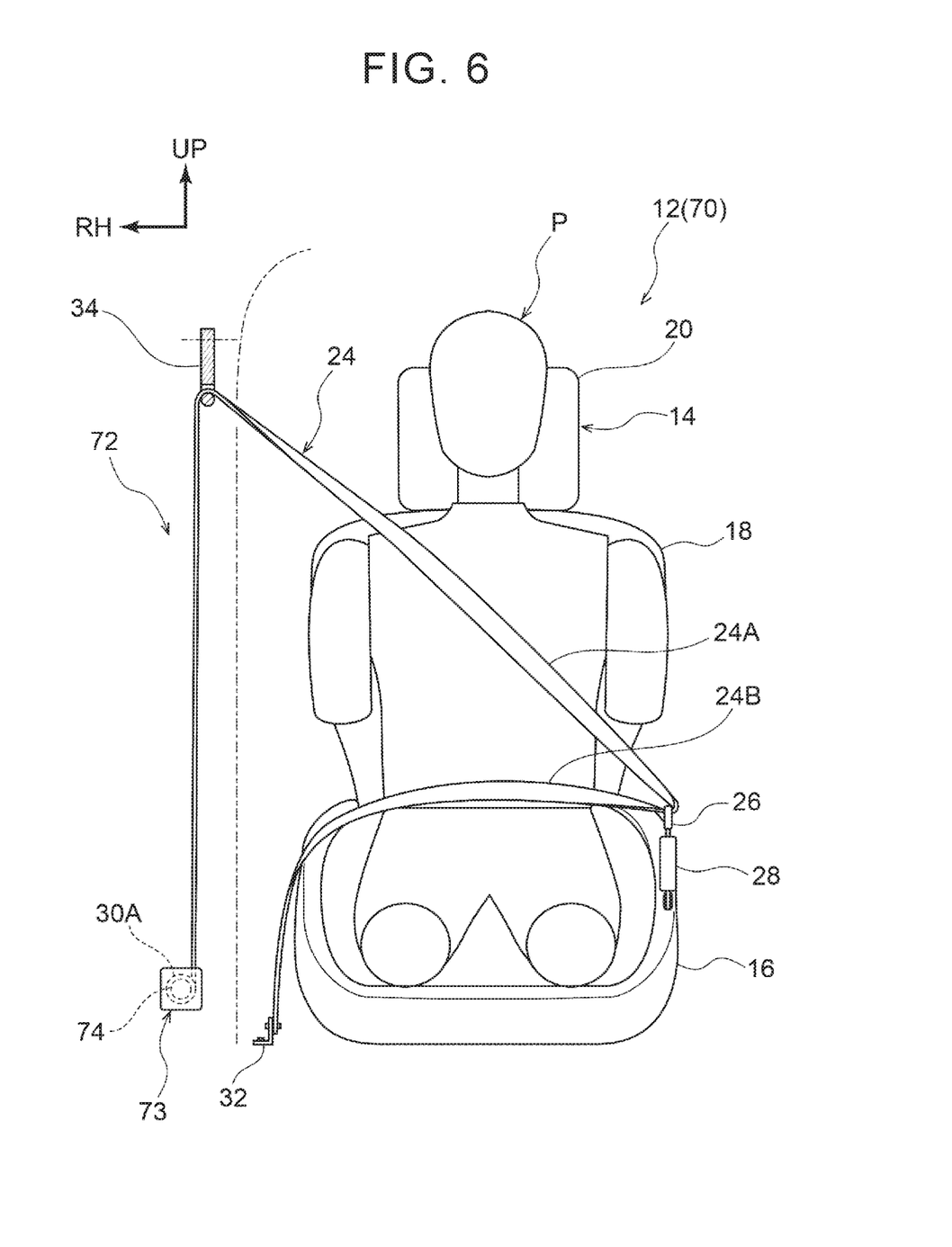
FIG. 6 is a schematic front view of a vehicle seat to which a vehicle occupant restraint system according to a second embodiment is applied when viewed from a vehicle front.
Figure 7:
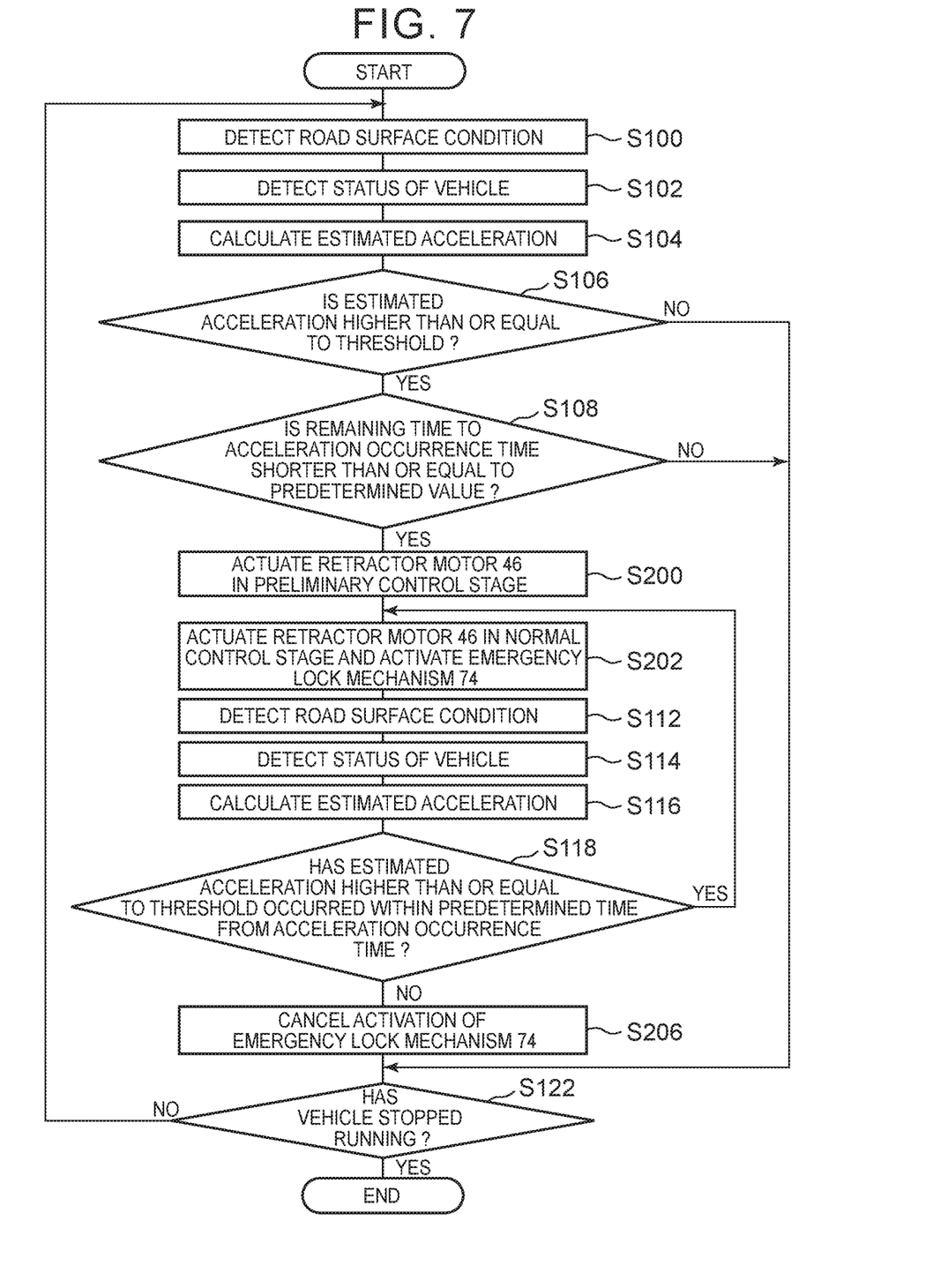
FIG. 7 is a flowchart that shows the flow of an occupant restraining process according to the second embodiment.

In other words, as shown in FIG. 6, a retractor 73 of the seatbelt device 72 includes the rotatable spool 30A connected to the retractor motor (not shown) inside. One end of the webbing 24 is wound on the spool 30A. The retractor 73 includes an emergency lock mechanism 74 as a holding mechanism. The emergency lock mechanism 74 is a so-called emergency lock retractor (ELR) that, when the spool 30A rotates at a predetermined rotation speed or higher, restricts further rotation of the spool 30A. The configuration of the ELR is known, so the detailed description is omitted.

As shown in FIG. 4, the vehicle occupant restraint system 70 includes the vehicle speed determination unit 60, the road surface condition detection unit 64, the steering angle velocity determination unit 62, the estimated acceleration determination unit 66, and a retractor motor control unit 80 as the functional components. The functional components are realized by the CPU 50 of the ECU 40 reading and running programs stored in the ROM 52 or the storage 56.

The retractor motor control unit 80 controls the direction and amount in which the spool 30A is rotated by the retractor motor 46 of the seatbelt device 22. Specifically, when the estimated acceleration is higher than or equal to the acceleration threshold and the remaining time is shorter than or equal to the predetermined value, the spool 30A is rotated in a direction in which the webbing 24 is taken up. The retractor motor control unit 80 is able to control the retractor motor 46 in a normal control stage in which the retractor motor 46 is driven at a driving force to such an extent that the spool 30A reaches the predetermined rotation speed and in a preliminary control stage in which the retractor motor 46 is driven at a driving force less than the driving force in the normal control stage. At the time when the estimated acceleration is higher than or equal to the acceleration threshold and the remaining time becomes shorter than or equal to the predetermined value, the retractor motor control unit 80 rotates the retractor motor 46 in the preliminary control stage and then rotates the retractor motor 46 in the normal control stage.

The retractor motor control unit 80, when the estimated acceleration higher than or equal to the acceleration threshold does not occur within a predetermined time after the emergency lock mechanism 74 is activated, cancels locking by the emergency lock mechanism 74 by rotating the spool 30A in a direction in which the webbing 24 is pulled out.

Next, the flow of an occupant restraining process that the vehicle occupant restraint system 70 executes will be described with reference to the flowchart of FIG. 7. For example, the occupant restraining process is executed by the CPU 50 reading out the program from the ROM 52 or the storage 56, expanding the program on the RAM 54, and running the program. Like step numbers denote the same steps as those of the first embodiment, and the description thereof will not be repeated.

The CPU 50 determines in step S108 whether the remaining time is shorter than or equal to the predetermined value. The CPU 50 goes to step S200 when the remaining time is shorter than or equal to the predetermined value or goes to step S122 when the remaining time is not shorter than or equal to the predetermined value.

The CPU 50 actuates the retractor motor 46 in step S200. The CPU 50 controls the retractor motor 46 with the function of the retractor motor control unit 80 such that the spool 30A is rotated in the take-up direction by a predetermined amount in the preliminary control stage. The CPU 50 goes to step S202.

The CPU 50 further actuates the retractor motor 46 in step S202. The CPU 50 controls the retractor motor 46 with the function of the retractor motor control unit 80 such that the spool 30A is rotated in the take-up direction by a predetermined amount in the normal control stage. Thus, the emergency lock mechanism 74 is activated. The CPU 50 goes to step S112.

The CPU 50 determines in step S118 whether the estimated acceleration (the estimated acceleration that is calculated in step S116) higher than or equal to the acceleration threshold occurs within the predetermined time based on acceleration occurrence time of the estimated acceleration calculated in step S104. The CPU 50 goes to step S206 when the estimated acceleration higher than or equal to the acceleration threshold does not occur within the predetermined time or returns to step S202 when the estimated acceleration higher than or equal to the acceleration threshold occurs within the predetermined time.

The CPU 50 cancels activation of the emergency lock mechanism 74 in step S206 by rotating the retractor motor 46 in the direction in which the webbing 24 is pulled out. The CPU 50 goes to step S122.

Operation and Effects of Second Embodiment

Next, the operation and effects of the present embodiment will be described.

The above configuration is similar to the configuration of the vehicle occupant restraint system 10 of the first embodiment except that the seatbelt device 72 includes the emergency lock mechanism 74, so similar effects to those of the first embodiment are obtained. The seatbelt device 72 includes the emergency lock mechanism 74, and the emergency lock mechanism 74 restricts pulling out of the webbing 24 after the webbing 24 is taken up by the predetermined amount by the CPU 50. Therefore, the output of the retractor motor 46 does not need to be increased to hold a state after the webbing 24 is taken up.

The seatbelt device 72 includes the emergency lock mechanism 74 that stops the rotation of the spool 30A when the spool 30A rotates at the predetermined rotation speed or higher. The emergency lock mechanism 74 is an ELR generally adopted to a seatbelt device as a mechanism configured to safely restrain an occupant P that moves with an impact load by locking pulling out of the webbing 24 in the event of a collision of a vehicle. The CPU 50 is configured to drive the retractor motor 46 such that the spool 30A reaches the predetermined rotation speed in the normal control stage, so pulling out of the webbing 24 is locked and the state after the webbing 24 is taken up is held by the emergency lock mechanism 74 without providing a new lock mechanism. With these configurations, cost is reduced.

The CPU 50 executes control so as to take up the webbing 24 with a small force at the time when a time that is taken from present time to occurrence of an estimated acceleration becomes shorter than or equal to the predetermined value and then take up the webbing 24 with a large force. Therefore, a slack of the webbing 24 is eliminated by taking up the webbing 24 with a small force in an initial stage, and then the occupant P is restrained by taking up the webbing 24 with a large force. Hence, impact that the occupant receives from the webbing 24 at the time when the webbing 24 is taken up is reduced. Thus, comfort is improved.

Third Embodiment

Next, a vehicle occupant restraint system according to a third embodiment of the present disclosure will be described with reference to FIG. 8 to FIG. 10. Like reference signs denote the same components as those of the above-described first embodiment, and the description thereof will not be repeated.

The vehicle occupant restraint system 90 according to the third embodiment has similar basic components to those of the first embodiment and differs from that of the first embodiment in that taking up of the webbing 24 and canceling taking up are possible by operating a drive mode select switch 94 connected to an ECU 92 serving as a controller.

Figure 8:
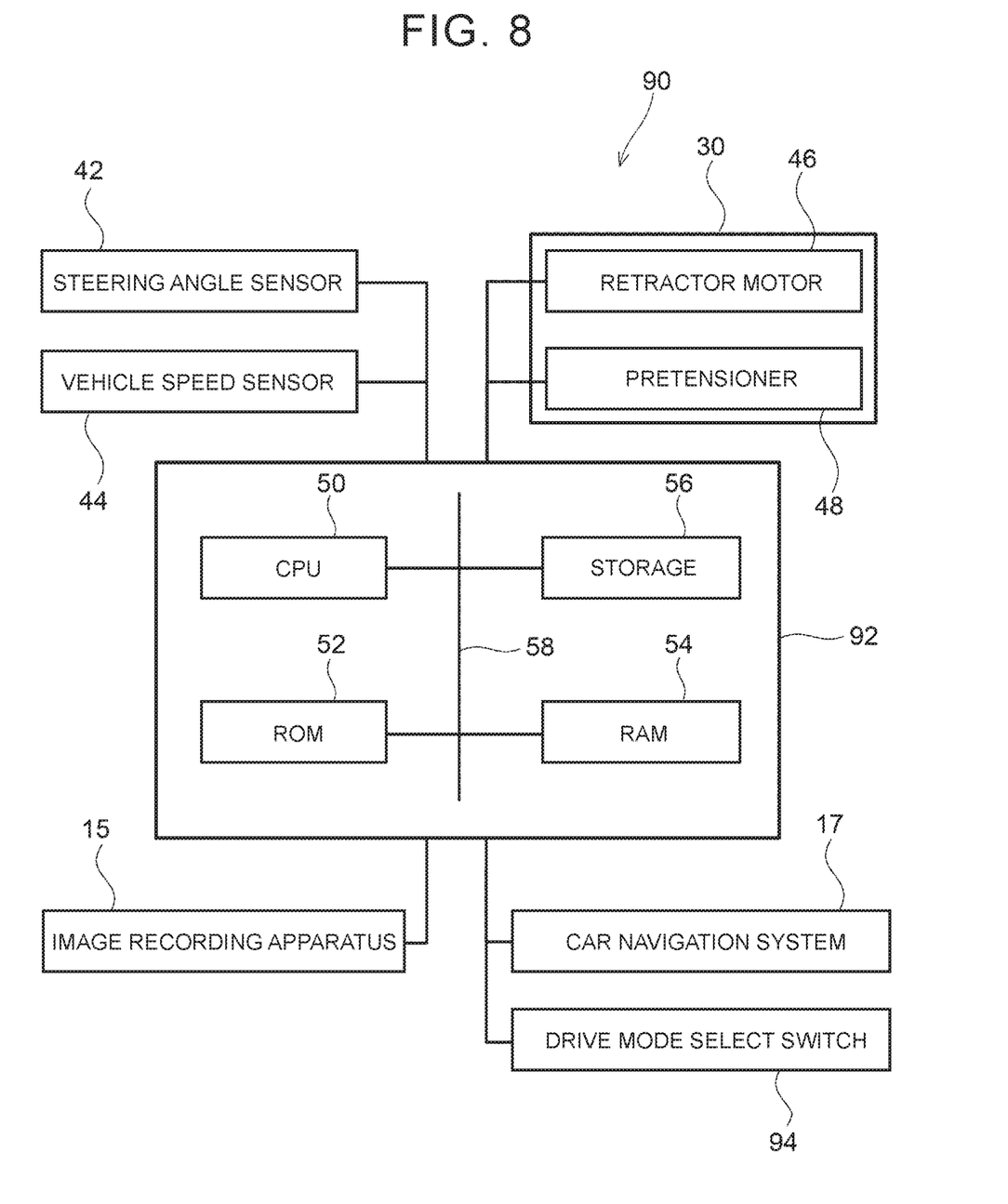
FIG. 8 is a block diagram that shows the hardware configuration of a vehicle occupant restraint system according to a third embodiment.

As shown in FIG. 8, the vehicle occupant restraint system 90 includes the electrical control unit (ECU) 92. The ECU 92 is electrically connected to the steering angle sensor 42, the vehicle speed sensor 44, the retractor motor 46, the pretensioner 48, the image recording apparatus 15, the car navigation system 17, and the drive mode select switch 94.

The drive mode select switch 94 is provided at a position where the occupant P is able to operate inside the vehicle. The occupant P is allowed to select shift timing, the output characteristics of a power unit, and the like, with the drive mode select switch 94 depending on a road surface condition on which the vehicle 12 runs. For example, in the present embodiment, the occupant P is allowed to select from among a normal drive mode, a rough road drive mode, and a sport drive mode with the drive mode select switch 94 in the present embodiment.

Figure 9:
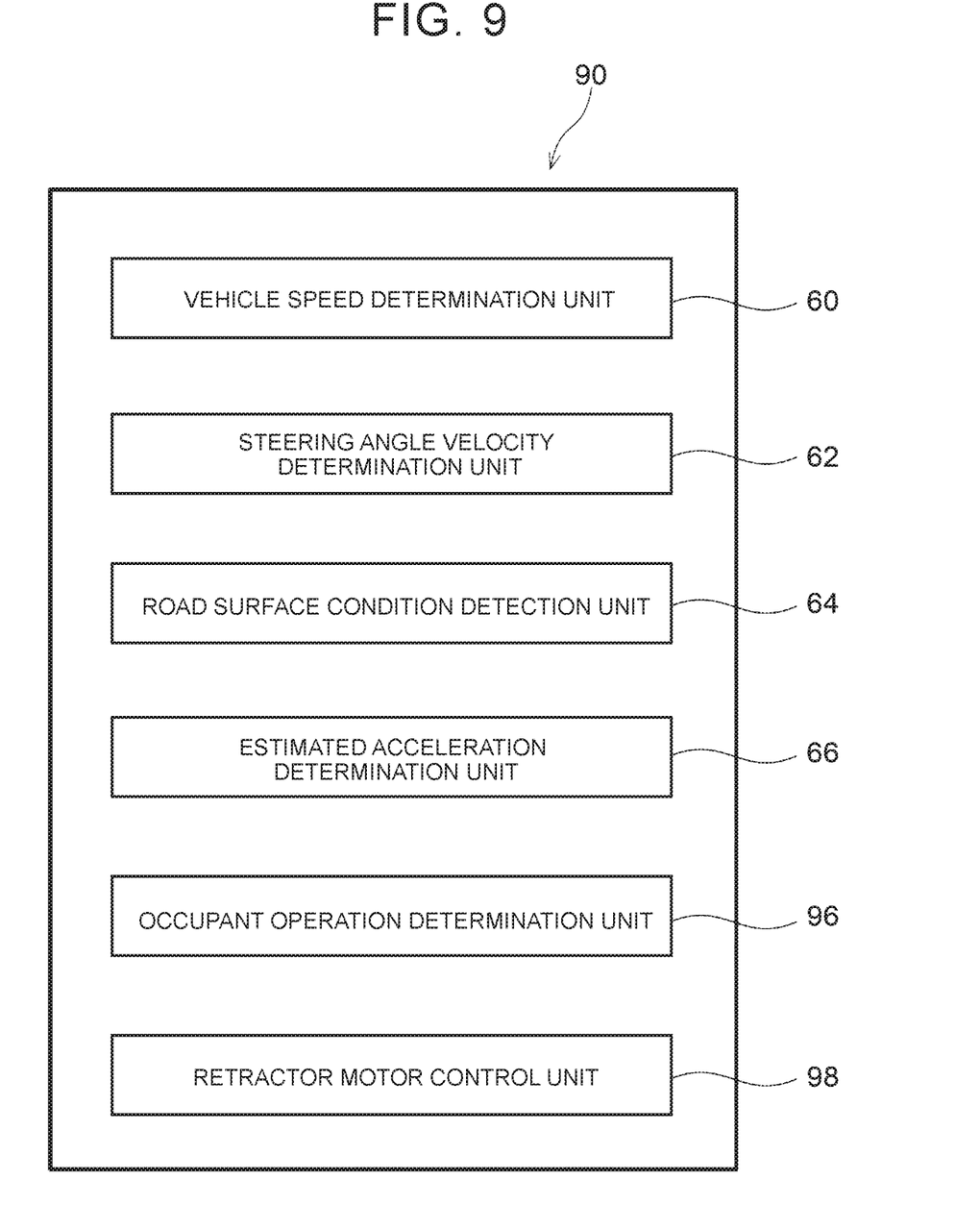
FIG. 9 is a block diagram that shows the functional configuration of the vehicle occupant restraint system according to the third embodiment.
Figure 10:
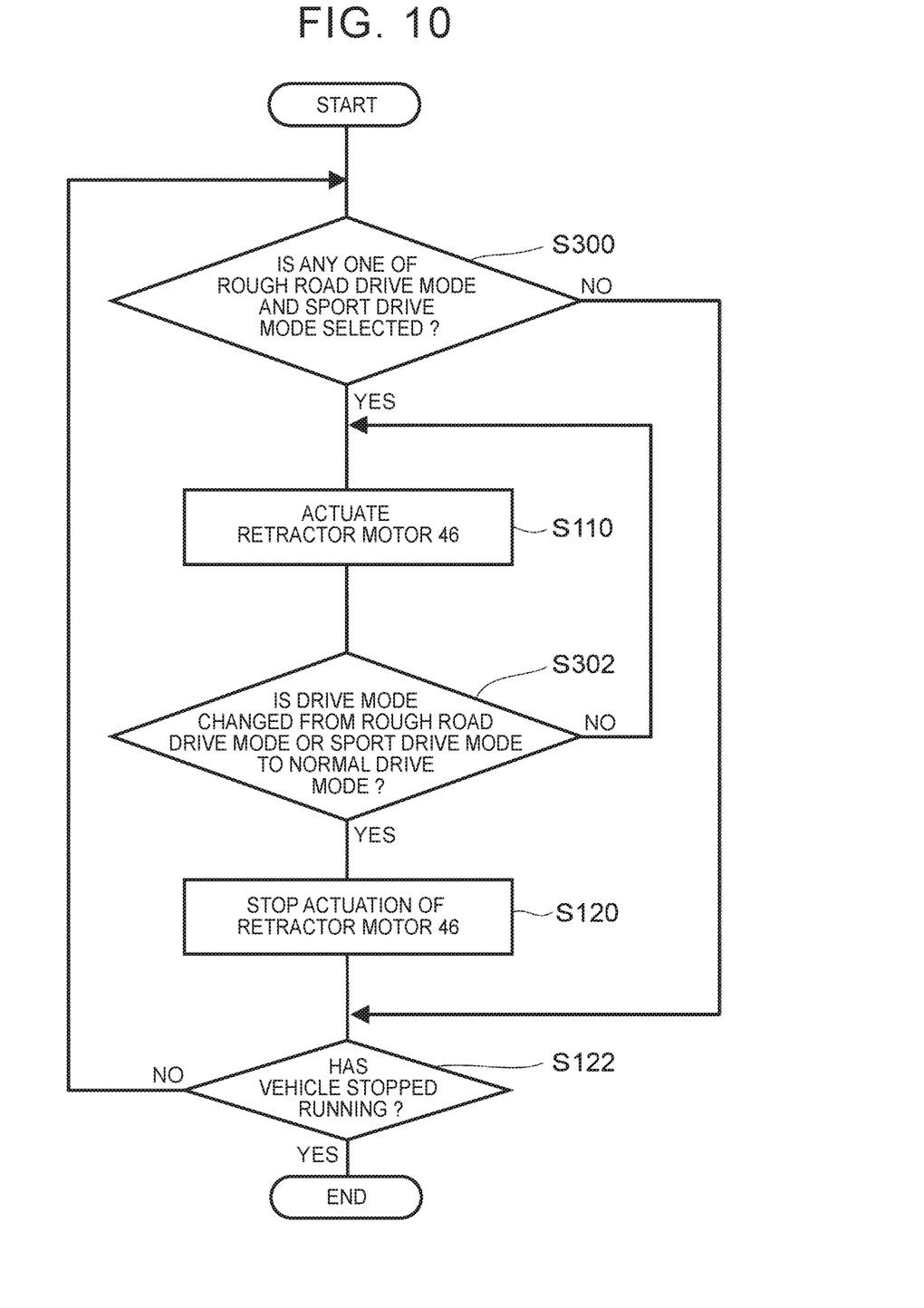
FIG. 10 is a flowchart that shows the flow of a vehicle occupant restraining process according to the third embodiment.

As shown in FIG. 9, the vehicle occupant restraint system 90 includes the vehicle speed determination unit 60, the road surface condition detection unit 64, the steering angle velocity determination unit 62, the estimated acceleration determination unit 66, an occupant operation determination unit 96, and a retractor motor control unit 98 as the functional components. The functional components are realized by the CPU 50 of the ECU 92 reading and running programs stored in the ROM 52 or the storage 56.

The occupant operation determination unit 96 determines the status of operation of the drive mode select switch 94. The retractor motor control unit 98 controls the direction and amount in which the spool 30A is rotated by the retractor motor 46 of the seatbelt device 22 according to the status of operation of the drive mode select switch 94, which is determined by the occupant operation determination unit 96. Specifically, when any one of the rough road drive mode and the sport drive mode is selected with the drive mode select switch 94, the retractor motor control unit 98 rotates the retractor motor 46 in the direction in which the webbing 24 is taken up. On the other hand, when the normal drive mode is selected, the retractor motor control unit 98 cancels the rotation of the retractor motor 46 in the direction in which the webbing 24 is taken up.

Next, the flow of an occupant restraining process that the vehicle occupant restraint system 90 executes will be described with reference to the flowchart of FIG. 10. For example, the occupant restraining process is executed by the CPU 50 reading out the program from the ROM 52 or the storage 56, expanding the program on the RAM 54, and running the program. Like step numbers denote the same steps as those of the first embodiment, and the description thereof will not be repeated.

The CPU 50 determines the status of operation of the drive mode select switch 94 in step S300. The CPU 50 goes to step S110 when the rough road drive mode or the sport drive mode is selected with the drive mode select switch 94 or goes to step S122 when the rough road drive mode or the sport drive mode is not selected with the drive mode select switch 94.

The CPU 50 determines the status of operation of the drive mode select switch 94 in step S302. The CPU 50 goes to step S120 when the drive mode select switch 94 is changed from the rough road drive mode or the sport drive mode to the normal drive mode or goes to step S110 when the drive mode select switch 94 is not changed to the normal drive mode.

Operation and Effects of Third Embodiment

Next, the operation and effects of the third embodiment will be described.

With the above configuration as well, since the configuration is similar to that of the vehicle occupant restraint system 10 of the first embodiment except that taking up of the webbing 24 and canceling taking up are allowed by operating the drive mode select switch 94 connected to the ECU 92, similar effects to those of the first embodiment are obtained. Taking up of the webbing 24 by the predetermined amount or canceling taking up are performed by operating the drive mode select switch 94 connected to the ECU 92, so the occupant P is restrained or restraining is canceled at occupant's required timing.

Since the status of operation of the drive mode select switch 94 is determined, the webbing 24 is taken up at the time when drive modes in which an acceleration is easily applied to the vehicle 12, such as the rough road drive mode and the sport drive mode, are selected. In addition, taking up of the webbing 24 is canceled at the time when the drive mode select switch 94 is changed from a drive mode in which an acceleration is easily applied to the vehicle 12 to the normal drive mode. Therefore, taking up of the webbing 24 and canceling taking up of the webbing 24 at unexpected timing are reduced in a drive state where an acceleration is easily applied to the vehicle 12, and the occupant P is restrained in an early stage. With these configurations, the occupant P is restrained at appropriate timing.

In the present embodiment, taking up of the webbing 24 or cancelling taking up is performed by determining the status of operation of the drive mode select switch 94; however, the configuration is not limited thereto. Taking up of the webbing 24 or canceling taking up may be performed by determining the status of operation of another switch.

Taking up of the webbing 24 or cancelling taking up is allowed by operating the drive mode select switch 94; however, the configuration is not limited thereto. The webbing 24 may also be taken up by a predetermined amount when an estimated acceleration is higher than or equal to the acceleration threshold and a remaining time to acceleration occurrence time becomes shorter than or equal to the predetermined time. Taking up of the webbing 24 may also be canceled when the predetermined time has elapsed in a state where an estimated acceleration is lower than or equal to the predetermined acceleration threshold.

The webbing 24 is taken up when any one of the rough road drive mode and the sport drive mode is selected with the drive mode select switch 94; however, the configuration is not limited thereto. The webbing 24 may be taken up in the case of another drive mode in which an acceleration that is applied to the vehicle 12 is estimated to be relatively high. At the same time, taking up of the webbing 24 may be canceled when the drive mode select switch 94 is changed into another drive mode in which an acceleration that is applied to the vehicle 12 is estimated to be relatively low.

Furthermore, the state where the webbing 24 is taken up is held by the retractor motor 46; however, the configuration is not limited thereto. As in the case of the second embodiment, the state where the webbing 24 is taken up may be held by the emergency lock mechanism 74.

In the second embodiment, the emergency lock mechanism 74 is the ELR; however, the configuration is not limited thereto. The emergency lock mechanism 74 may be another component, such as a component that electrically actuates a lock mechanism by using a solenoid and a component that increases the rotational torque of an urging device that urges the spool 30A in the take-up direction.

In the first to third embodiments, as shown in FIG. 1, the retractor 30 serving as the take-up device is provided on the vehicle body side; however, the configuration is not limited thereto. A so-called seat-integrated seatbelt device in which the retractor 30 and the belt guide are provided on the vehicle seat 14 may be employed. In this case, the other end of the webbing 24 is fixed to the vehicle seat 14.

Various processors other than the CPU 50 may execute the processes that the CPU 50 executes in the above-described embodiments by reading software (programs). Examples of the processors in this case include a programmable logic device (PLD) of which the circuit configuration is changeable after production, such as a field-programmable gate array (FPGA), and a dedicated electrical circuit that is a processor having a circuit configuration designed exclusively to execute a specific process, such as an application specific integrated circuit (ASIC). The above-described processes may be executed by one of these various processors or may be executed by a combination of two or more processors of the same type or different types (for example, a plurality of FPGAs, a combination of a CPU and an FPGA, or the like). The hardware structures of these various processors are more specifically electrical circuits made up of combinations of circuit elements, such as semiconductor elements.

In the above-described embodiments, the storage 56 is used as a recording unit; however, the configuration is not limited thereto. For example, a recording medium, such as a compact disk (CD), a digital versatile disk (DVD), and a universal serial bus (USB) memory, may be used as a recording unit.

What is claimed is:

1. A vehicle occupant restraint system comprising:
  a seatbelt device configured to be able to restrain an occupant seated on a vehicle seat by using a webbing of which one end is wound on a take-up device and the other end is fixed to the vehicle seat or a vehicle body and configured to be able to take up the webbing by driving a motor provided in the take-up device, the seatbelt device includes an emergency lock mechanism configured to, when a take-up shaft of the take-up device rotates at a predetermined rotation speed or higher, stop rotation of the take-up shaft;
  a road surface condition detection unit configured to detect a road surface condition ahead of a vehicle in a direction of travel;
  a vehicle status detection unit configured to detect a status of the vehicle; and
  a controller configured to compute an estimated acceleration that is estimated to be applied to the vehicle and a time that is taken from present time to acceleration occurrence time at which the estimated acceleration is anticipated to occur from the road surface condition detected by the road surface condition detection unit and the status of the vehicle, detected by the vehicle status detection unit, and, when the estimated acceleration is higher than or equal to a predetermined acceleration threshold and the time that is taken from present time to acceleration occurrence time at which the estimated acceleration is anticipated to occur becomes shorter than or equal to a predetermined value, take up the webbing by a predetermined amount by driving the motor,
  the controller is configured to be able to control the motor in a normal control stage in which the motor is driven at a normal driving force and a preliminary control stage in which the motor is driven at a driving force less than the normal driving force, and the controller is configured to, when the time that is taken from present time to acceleration occurrence time at which the estimated acceleration is anticipated to occur becomes shorter than or equal to the predetermined value, drive the motor in the preliminary control stage and then drive the motor in the normal control stage to activate the emergency lock mechanism, and
  the controller is configured to drive the motor such that the take-up shaft reaches the predetermined rotation speed in the normal control stage.

2. The vehicle occupant restraint system according to claim 1, wherein the seatbelt device includes a holding mechanism configured to restrict pulling out of the webbing after the webbing is taken up by the predetermined amount by the controller.

3. The vehicle occupant restraint system according to claim 1, wherein the controller is configured to, when a predetermined time has elapsed in a state where the estimated acceleration is lower than or equal to the predetermined acceleration threshold after the webbing is taken up, cancel taking up of the webbing.

4. The vehicle occupant restraint system according to claim 1, wherein the controller is connected to a switch operational by the occupant of the vehicle and is configured to take up the webbing by the predetermined amount or cancel taking up of the webbing when the switch is operated.

5. The vehicle occupant restraint system according to claim 4, wherein the switch is a drive mode select switch.

6. The vehicle occupant restraint system according to claim 1, wherein the vehicle status detection unit is configured to detect the status of the vehicle from the vehicle speed and steering angle.

7. A vehicle occupant restraint system comprising:
a seatbelt device configured to be able to restrain an occupant seated on a vehicle seat by using a webbing of which one end is wound on a take-up device and the other end is fixed to the vehicle seat or a vehicle body and configured to be able to take up the webbing by driving a motor provided in the take-up device;
a road surface condition detection unit configured to detect a road surface condition ahead of a vehicle in a direction of travel;
a vehicle status detection unit configured to detect a status of the vehicle; and
a controller configured to compute an estimated acceleration that is estimated to be applied to the vehicle and a time that is taken from present time to acceleration occurrence time at which the estimated acceleration is anticipated to occur from the road surface condition detected by the road surface condition detection unit and the status of the vehicle, detected by the vehicle status detection unit, and, when the estimated acceleration is higher than or equal to a predetermined acceleration threshold and the time that is taken from present time to acceleration occurrence time at which the estimated acceleration is anticipated to occur becomes shorter than or equal to a predetermined value, take up the webbing by a predetermined amount by driving the motor,
the controller is connected to a switch operational by the occupant of the vehicle and is configured to take up the webbing by the predetermined amount or cancel taking up of the webbing when the switch is operated, the switch is a drive mode select switch configured to be operated by the occupant to select one of a rough road drive mode, a sport drive mode, or a normal drive mode, and
the controller is configured to take up the webbing by the predetermined amount when any one of the rough road drive mode and the sport drive mode is selected and that the controller is configured to cancel taking up of the webbing when the normal drive mode is selected.

8. The vehicle occupant restraint system according to claim 7, wherein the seatbelt device includes a holding mechanism configured to restrict pulling out of the webbing after the webbing is taken up by the predetermined amount by the controller.

9. The vehicle occupant restraint system according to claim 7, wherein the controller is configured to, when a predetermined time has elapsed in a state where the estimated acceleration is lower than or equal to the predetermined acceleration threshold after the webbing is taken up, cancel taking up of the webbing.

10. The vehicle occupant restraint system according to claim 7, wherein the controller is configured to be able to control the motor in a normal control stage in which the motor is driven at a normal driving force and a preliminary control stage in which the motor is driven at a driving force less than the normal driving force, and the controller is configured to, when the time that is taken from present time to acceleration occurrence time at which the estimated acceleration is anticipated to occur becomes shorter than or equal to the predetermined value, drive the motor in the preliminary control stage and then drive the motor in the normal control stage.

11. The vehicle occupant restraint system according to claim 10, wherein:
the seatbelt device includes an emergency lock mechanism configured to, when a take-up shaft of the take-up device rotates at a predetermined rotation speed or higher, stop rotation of the take-up shaft; and
the controller is configured to drive the motor such that the take-up shaft reaches the predetermined rotation speed in the normal control stage.

* * * * *